（12）United States Patent
Kalliola et al.

(10) Patent No.: US 10,602,396 B2
(45) Date of Patent: Mar. 24, 2020

(54) DETECTION AND MITIGATION OF SIGNALLING ANOMALIES IN WIRELESS NETWORK (71) Applicant: Nokia Solutions and Networks Oy, Espoo (FI)

(72) Inventors: Aapo Kalliola, Espoo (FI); Ian Justin Oliver, Soderkulla (FI); Yoan Jean Claude Miche, Espoo (FI); Silke Holtmanns, Klaukkala (FI); Amaanat Ali, Espoo (FI); Pekka Kuure, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/785,915

(22) Filed: Oct. 17, 2017

(65) Prior Publication Data

US 2018/0109975 A1 Apr. 19, 2018

(30) Foreign Application Priority Data

Oct. 18, 2016 (EP) .................... 16194372

(51) Int. Cl.
*H04W 28/02* (2009.01)
*H04L 29/06* (2006.01)
(Continued)

(52) U.S. Cl.
CPC ..... *H04W 28/0289* (2013.01); *H04L 43/0876* (2013.01); *H04L 63/1425* (2013.01);
(Continued)

(58) Field of Classification Search
CPC . H04W 28/08; H04W 28/18; H04W 28/0231; H04W 28/0247; H04W 28/0284;
(Continued)

(56) References Cited

U.S. PATENT DOCUMENTS 6,266,531 B1 * 7/2001 Zadeh ................... H04W 16/06
455/436
8,971,871 B2 * 3/2015 Saitou ................... H04W 24/04
370/312
(Continued)

FOREIGN PATENT DOCUMENTS

EP 1434456 A2 6/2004
JP 2004/207839 A 7/2004
(Continued)

OTHER PUBLICATIONS

Gokce Gorbil et al; "Storms in Mobile Networks"; Proceedings of the 10th ACM symposium on QoS and security for wireless and mobile networks; pp. 119-126; Sep. 2014.

*Primary Examiner* — Curtis A Alia
(74) *Attorney, Agent, or Firm* — Harrington & Smith (57) ABSTRACT This document discloses a solution for detecting and mitigating anomalies such as signalling storms in a radio access network of a wireless communication system. According to an aspect, there is disclosed a method including receiving, in a first local traffic analysis module, configuration parameters from a second local traffic analysis module or from a central traffic analysis module connected to a plurality of local traffic analysis modules; monitoring, by a first traffic analysis module by using the received configuration parameters, traffic in a radio access network of a wireless communication system; detecting, in the monitored traffic on the basis of the configuration parameters, an anomaly causing a control plane signalling load; and in response to said detecting, taking an action to mitigate the anomaly and reporting information on the anomaly to the central traffic analysis module.

17 Claims, 8 Drawing Sheets

(51) Int. Cl.
*H04W 24/04* (2009.01)
*H04L 12/26* (2006.01)
*H04W 24/08* (2009.01)
*H04W 28/08* (2009.01)
*H04W 24/02* (2009.01)
*H04W 24/10* (2009.01)
*H04W 28/18* (2009.01)

(52) U.S. Cl.
CPC ........... *H04W 24/04* (2013.01); *H04W 24/08* (2013.01); *H04W 28/0284* (2013.01); *H04W 28/08* (2013.01); H04L 63/1441 (2013.01); H04W 24/02 (2013.01); H04W 24/10 (2013.01); H04W 28/0231 (2013.01); H04W 28/0247 (2013.01); H04W 28/18 (2013.01)

(58) Field of Classification Search
CPC ..... H04W 24/02; H04W 24/04; H04W 24/08; H04W 24/10; H04L 63/1425; H04L 63/1441; H04L 43/0876
See application file for complete search history.

(56) References Cited

U.S. PATENT DOCUMENTS

| | | | | |
|---|---|---|---|---|
| 9,119,075 | B2* | 8/2015 | Kusumoto | H04L 63/1416 |
| 9,204,329 | B2* | 12/2015 | Boyle | H04W 48/00 |
| 2003/0165124 | A1* | 9/2003 | Alperovich | H04W 36/22 370/331 |
| 2012/0040684 | A1* | 2/2012 | Gao | H04W 28/08 455/453 |
| 2012/0155274 | A1 | 6/2012 | Wang et al. | |
| 2012/0208562 | A1* | 8/2012 | Wilkin | H04L 41/12 455/456.3 |
| 2012/0233311 | A1* | 9/2012 | Parker | H04L 43/00 709/224 |
| 2012/0329403 | A1* | 12/2012 | Muraoka | H04W 16/14 455/67.13 |
| 2013/0031599 | A1* | 1/2013 | Luna | G06F 21/554 726/1 |
| 2014/0022904 | A1* | 1/2014 | Ahmad | H04W 28/0289 370/235 |
| 2015/0071053 | A1 | 3/2015 | Kempf et al. | |
| 2015/0333998 | A1* | 11/2015 | Gopalakrishnan | H04L 43/16 370/244 |
| 2016/0044531 | A1 | 2/2016 | Papa et al. | |
| 2016/0219065 | A1 | 7/2016 | Dasgupta et al. | |
| 2016/0227434 | A1* | 8/2016 | Grinshpun | H04W 28/0289 |
| 2016/0241429 | A1 | 8/2016 | Froehlich et al. | |
| 2016/0294660 | A1* | 10/2016 | Salvador | H04L 43/087 |
| 2017/0303180 | A1* | 10/2017 | Kapoulas | H04W 36/30 |

FOREIGN PATENT DOCUMENTS

| | | |
|---|---|---|
| WO | WO 2012027888 A1 | 3/2012 |
| WO | WO 2015123836 A1 | 8/2015 |
| WO | WO 2015124326 A1 | 8/2015 |

* cited by examiner

DETECTION AND MITIGATION OF SIGNALLING ANOMALIES IN WIRELESS NETWORK

TECHNICAL FIELD

The invention relates to wireless communication systems and, in particular, to a solution for detecting and mitigating signalling anomalies in a radio access network.

BACKGROUND

User equipment (UE) connectivity in a mobile network is dependent on a functioning control plane of an air interface between UE and an access node such as a base station or (evolved) Node B. The control plane may become overloaded by atypically high signalling load caused by malicious or incorrectly configured UE. This overload condition may in some instances be called a signalling storm. The signalling storm can effectively prevent a large portion of UEs from connecting to an access node affected by the signalling storm. In addition to degrading connectivity, the signalling storm may cause devastating impact for safety-critical communications such as vehicle-to-vehicle communications. With the development of Internet of Things (IoT) concept, more and more machine-type communication devices appear on the market and all of them may not be tested properly and operate erratically.

Signaling storms are non-trivial to mitigate because they congest the control plane of the air interface. The damage to an operator of the system may include service problems such as outage in a small or even a wide area. Baseband operation of the UE is generally considered to be standard-compliant, but this is not necessarily the case. Computer programs executed on the baseband may be susceptible to malicious use or, in the extreme case, UE may be a rogue radio transmitter implementing only the functions necessary for attacking the mobile network. Proliferation of software defined radio (SDR) technology makes the latter scenario increasingly possible and for attackers more exploitable. In addition to harmful air interface activity by a few non-compliant UEs, it is necessary to consider a case where signaling traffic of a large portion of the UE population increases significantly, e.g. as a result of application level malware infecting UEs.

BRIEF DESCRIPTION

The invention is defined by the subject matter of the independent claims. Some embodiments are defined in the dependent claims.

According to an aspect, there is provided an apparatus as specified in claim 13.

In an embodiment, the apparatus comprises at least one processor and at least one memory comprising a computer program code, wherein the processor, the memory, and the computer program code are configured to cause the apparatus to operate as a first traffic analysis module and to: receive configuration parameters from a second local traffic analysis module, or from a central traffic analysis module connected to a plurality of local traffic analysis modules; monitor, by using the received configuration parameters, traffic in a radio access network of a wireless communication system; detect, on the basis of the configuration parameters, an anomaly causing a control plane signalling load; and in response to said detecting, take an action to mitigate the anomaly and report information on the anomaly to the central traffic analysis module.

In an embodiment, the processor, the memory, and the computer program code are configured to cause the apparatus to perform said reporting by at least transmitting data representing traffic that caused said detection to the central traffic analysis module.

In an embodiment, the processor, the memory, and the computer program code are configured to cause the apparatus to indicate the detected anomaly to another local traffic analysis module.

In an embodiment, the processor, the memory, and the computer program code are configured to cause the apparatus to: identify a device causing said anomaly on the basis of at least one message of the monitored traffic; and route at least some of traffic associated with the identified device to the central traffic analysis module.

In an embodiment, the processor, the memory, and the computer program code are configured to cause the apparatus to perform said action to mitigate the anomaly by performing at least: identifying a device causing said anomaly on the basis of at least one message of the monitored traffic; and controlling traffic of the identified device.

In an embodiment, the processor, the memory, and the computer program code are configured to cause the apparatus to perform said controlling the traffic of the identified device by performing at least one of the following traffic control functions: blocking the device, causing handover of the device from one access node to another access node, suspending communication with the device, reducing traffic volume of the device while allowing the device to cause traffic, transmitting a message to an owner of the device, and causing software or firmware update at the device.

In an embodiment, the apparatus is suitable for monitoring traffic in an access node of the radio access network.

In an embodiment the apparatus of claim 13 comprises at least one processor and at least one memory comprising a computer program code, wherein the processor, the memory, and the computer program code are configured to cause the apparatus to operate as a central traffic analysis module and to: establish a communication connection with a plurality of local traffic analysis modules configured to monitor traffic in a radio access network of a wireless communication system; receive, from a first local traffic analysis module, information on an anomaly causing a control plane signalling load; analyse the received information and determine, on the basis of the analysis, whether or not to carry out an action related to the anomaly; and upon determining to carry out the action, cause transmission of a configuration message to at least one of another central traffic analysis module and at least one of the plurality of local traffic analysis modules.

In an embodiment, the processor, the memory, and the computer program code are configured to cause the apparatus to perform said analysing by at least using machine learning to determine whether or not the received information indicates presence of the anomaly.

In an embodiment, the processor, the memory, and the computer program code are configured to cause the apparatus to include, upon detecting the anomaly, in the configuration message a command to perform an action to mitigate the anomaly and cause transmission of the configuration message to said at least one of the plurality of local traffic analysis modules.

In an embodiment, the processor, the memory, and the computer program code are configured to cause the apparatus to include, upon detecting the anomaly, characteristics of the anomaly in the configuration message and informing said other central traffic analysis module about the anomaly.

In an embodiment, the processor, the memory, and the computer program code are configured to cause the apparatus to determine, upon detecting the anomaly, a terminal device that causes the anomaly and to modify at least one register entry of the terminal device in a location register of the terminal device.

In an embodiment, the processor, the memory, and the computer program code are configured to cause the apparatus to provide the plurality of local traffic analysis modules with configuration parameters enabling the plurality of local traffic analysis modules to use machine learning to detect anomalies from monitored traffic in the radio access network.

In an embodiment, the apparatus further comprises a communication interface providing the apparatus with radio communication capability.

BRIEF DESCRIPTION OF THE DRAWINGS

In the following the invention will be described in greater detail by means of preferred embodiments with reference to the accompanying drawings, in which.

DETAILED DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, 5G system, and/or a future system.

The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, many more base stations or nodes than the current network deployments of LTE (a so-called small cell concept), including macro sites operating in co-operation with smaller local area access nodes and perhaps also employing a variety of radio technologies for better coverage and enhanced data rates 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or modules that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent Some other technology advancements probably to be used are Software-Defined Networking (SDN), Big Data, and all-IP, which may change the way networks are being constructed and managed.

Figure 1:
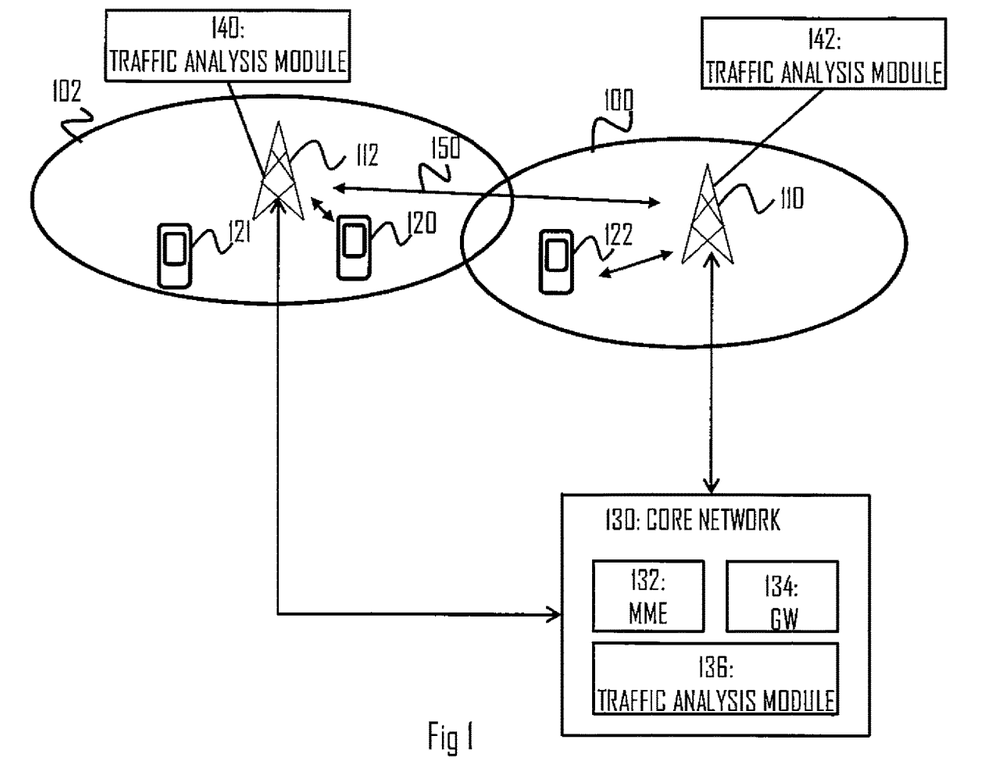
FIG. 1 illustrates a wireless communication scenario to which some embodiments of the invention may be applied.

FIG. 1 illustrates an example of a communication system to which some embodiments of the invention may be applied. The system may comprise at least one access node 110, 112 providing and managing a cell 100, 102. The cell may be, e.g., a macro cell, a micro cell, femto, or a pico cell, for example. From another point of view, the cell may define a coverage area or a service area of the access node 110, 112. The access node 110, 112 may be an evolved Node B (eNB) as in the LTE and LTE-A, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node 110, 112 may be called a base station or a network node. The system may be a cellular communication system composed of a radio access network of access nodes, each controlling a respective cell or cells. The access nodes may provide terminal devices 120, 121, 122 with wireless access to other networks such as the Internet. In some scenarios, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within the macro cell. The operation of the local area access node may be controlled by an access node under whose control area the sub-cell is provided.

In the case of multiple access nodes in the communication network, the access nodes may be connected to each other with an interface 150. LTE specifications call such an interface as X2 or S1 interface. In IEEE 802.11 networks, a similar interface is provided between access points. The interface 150 may provide the access nodes with capability of communicating directly with one another. Other communication methods between the access nodes may also be possible. The access nodes may be further connected via another interface to a core network 130 of the cellular communication system. The LTE specifications specify the core network as an evolved packet core (EPC), and the core network may comprise a mobility management module (MME) 132 and a gateway (GW) node 134. The MME may handle mobility of terminal devices in a tracking area encompassing a plurality of cells and also handle signalling connections between the terminal devices and the core network 130. The gateway node 134 may handle data routing in the core network 130 and to/from the terminal devices.

The radio system of FIG. 1 may support Machine Type Communication (MTC). MTC may enable providing service for a large amount of MTC capable devices, such as the at least one terminal device 120 to 122. The at least one terminal device 120 to 122 may comprise a mobile phone, smart phone, tablet computer, laptop or other devices used for user communication with the radio communication network, such as an MTC network. These devices may provide further functonality compared to the MTC scheme, such as communication link for voice, video and/or data transfer. However, in MTC perspective the at least one terminal device 120 to 122 may be understood as a MTC device. It needs to be understood that the at least one terminal device 120 to 122 may also comprise another MTC capable device, such as a sensor device providing position, acceleration and/or temperature information to name a few examples. Some embodiments of the invention may thus be applicable to Internet of Things (IoT) systems, e.g. a radio access technology supporting a narrowband IoT (NB-IoT) communication scheme.

As described above, the signalling storms in a radio access network may cause performance degradation in the radio access network and the service capability of the communication system including the radio access network of access nodes 110, 112 and the core network 130. In order to detect the signalling storms in the radio access network, one or more traffic analysis modules 140, 142 may be configured to monitor traffic in the radio access network, e.g. in an access node 110, 112 and to search for signatures of signalling storms from the traffic. In some embodiments, the core network 130 may also (or alternatively) comprise a traffic analysis module 136 configured to serve as a central module for a plurality of local traffic analysis modules 140, 142. The modules 136, 140, 142 may be configured to detect and, in cooperation with each other, to mitigate the signalling storms, thus improving the performance of the wireless communication system.

Figure 2:
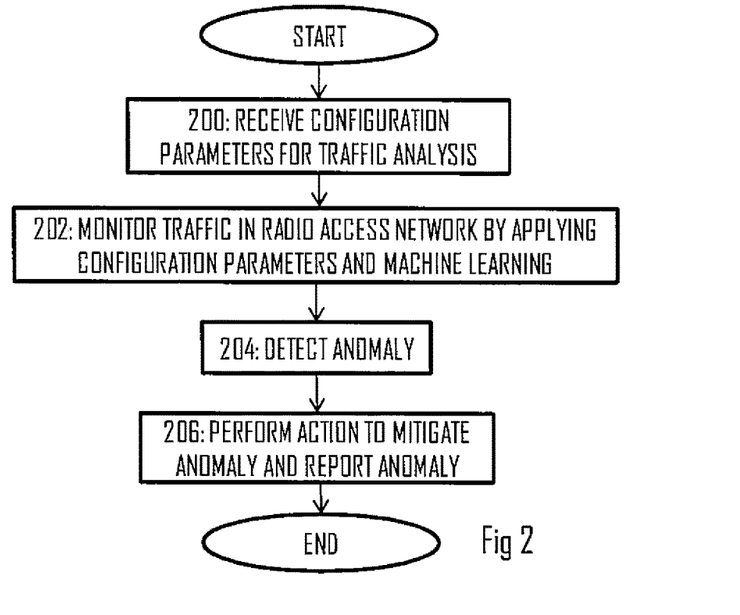
FIGS. 2 and 3 illustrate flow diagrams of some embodiments for detecting and mitigating anomalies in traffic routed in a radio access network of a communication system.
Figure 3:
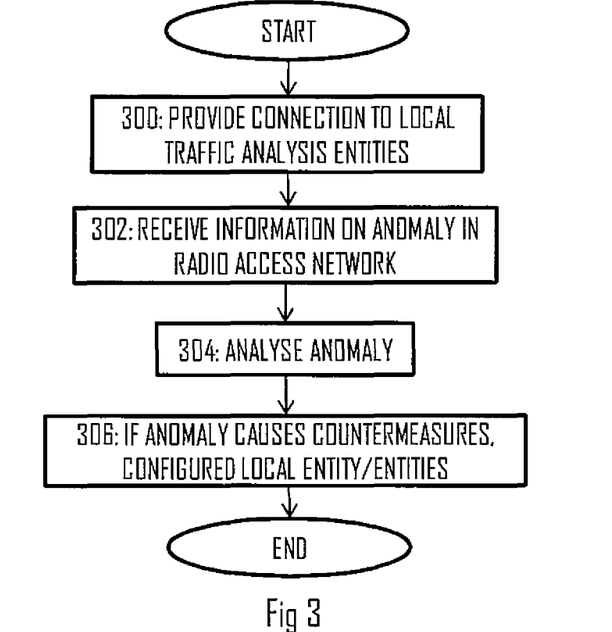

FIGS. 2 and 3 illustrate some embodiments for detecting anomalies representing the signalling storms. FIG. 2 illustrates a process executed in a local traffic analysis module 140, 142, and FIG. 3 illustrates a process executed in a central traffic analysis module 136. Referring to FIG. 2, the process may comprise: receiving (block 200), in a first local traffic analysis module, configuration parameters from a second local traffic analysis module or from a central traffic analysis module connected to a plurality of local traffic analysis modules; monitoring (block 202), by a first traffic analysis module by using machine learning and the received configuration parameters, traffic in a radio access network of a wireless communication system; detecting (block 204), in the monitored traffic on the basis of the configuration parameters, an anomaly causing a control plane signalling load; and in response to said detecting, taking (block 206) an action to mitigate the anomaly and reporting information on the anomaly to the central traffic analysis module.

Referring to FIG. 3, the process may comprise: providing (block 300), in a central traffic analysis module, a communication connection with a plurality of local traffic analysis modules configured to monitor traffic in a radio access network of a wireless communication system; receiving (block 302), in the central traffic analysis module from a first local traffic analysis module, information on an anomaly causing a control plane signalling load; analysing (block 304) the received information and determining, on the basis of the analysis, whether or not to carry out an action related to the anomaly; and upon determining to carry out the action in the central traffic analysis module, causing (block 306) transmission of a configuration message to at least one of another central traffic analysis module and at least one of the plurality of local traffic analysis modules.

As described above in connection with FIGS. 1 to 3, the detection and mitigation of the signalling storms is organized such that the traffic analysis modules 136, 140, 142 are provided on multiple hierarchy levels. The local traffic analysis modules 140, 142 may be connected directly to or at least close to a monitored interface routing traffic being analysed for the anomaly. The local traffic analysis modules 140, 142 may be configured to capture traffic from the interface and to process it for the detection of the anomaly. The processing may comprise analysis of the captured traffic on the basis of the received configuration parameters. The local traffic analysis modules 140, 142 may communicate with the central traffic analysis module 136 provided in the core network 130. The central traffic analysis module 136 may gather information from multiple local traffic analysis modules and, in some embodiments, from other central traffic analysis modules and, with the available higher amount of information, build a big picture of the characteristics of the system behaviour. Accordingly, the central traffic analysis module may have available more information to support for the detection of the anomaly and selecting proper countermeasures.

Figure 4:
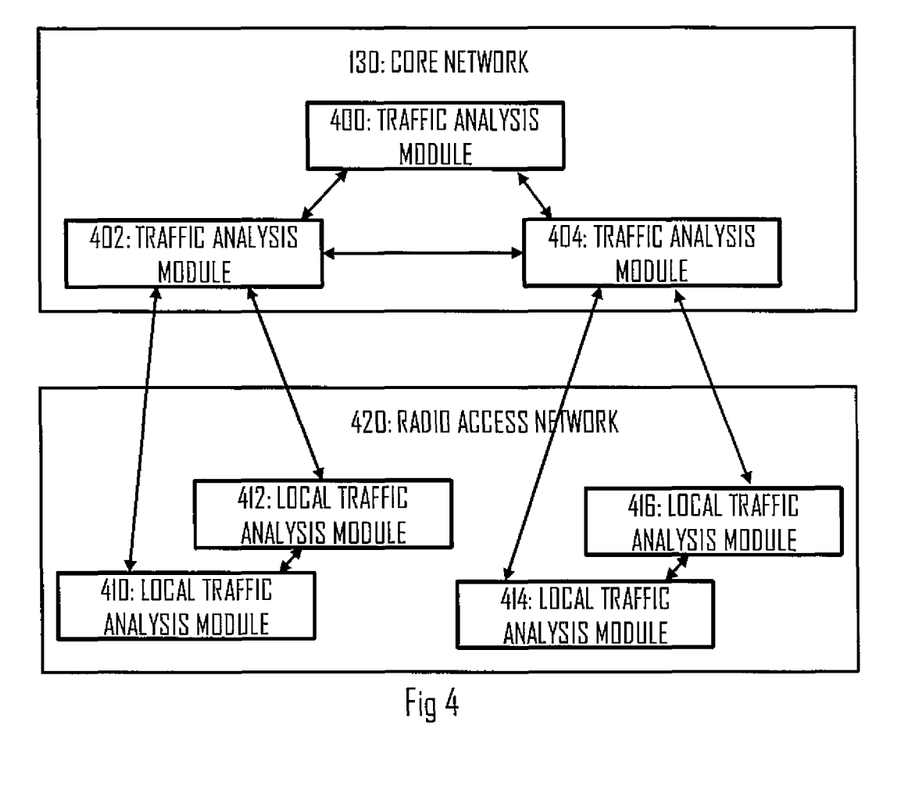
FIG. 4 illustrates a hierarchic arrangement of traffic analysis modules according to an embodiment of the invention.

FIG. 4 illustrates an embodiment of the hierarchy. Referring to FIG. 4, a plurality of local traffic analysis modules 410, 412, 414, 416 may be provided in the radio access network 420, e.g. such that a local traffic analysis module is connected to or comprised in each access node of the radio access network 420. The local traffic analysis modules 410 to 416 may form the lowest level of the hierarchy. Central traffic analysis modules 400, 402, 404 may be provided in the core network or be connected to the core network 130. The central traffic analysis module(s) 400, 402, 404 may be operationally provided in connection with the MME 132 or gateway 134, for example. Each central traffic analysis module 400 to 404 may connect to a plurality of traffic analysis modules provided on a lower hierarchy level. The central traffic analysis modules are categorized into two hierarchy levels in FIG. 4. Central traffic analysis modules 402 and 404 connect to the local traffic analysis modules 410, 412 and 414, 416, respectively. They 402, 404 may also communicate with each other. On a higher hierarchy level, a central traffic analysis module 400 may be connected to the lower level central traffic analysis modules 402, 404. In some embodiments, the central traffic analysis modules are provided only on one hierarchy level.

The local traffic analysis modules may be grouped such that all the local traffic analysis modules that communicate with the same central traffic analysis module 402 or 404 may be grouped together. The local traffic analysis modules may communicate directly with other local traffic analysis modules at least within the group but also optionally with local traffic analysis modules of another group.

As illustrated in FIG. 4, the traffic analysis modules are arranged on multiple hierarchy levels such that a traffic analysis module on a higher hierarchy level has available more information on traffic characteristics, operation in other parts of the system, and signatures of anomalies. The central traffic analysis modules may also be provided with more processing capacity and/or memory resources than the local traffic analysis modules.

The above-described network virtualization provides a possibility that only analog signal processing is carried out on a base station site, and any digital communications are carried out in an arbitrary location. This also means that a single physical processing entity, e.g. a server computer or multiple connected servers or a cloud computing system, may carry out the processing tasks of one or more traffic analysis modules 400 to 416. The virtualization also enables instantiation of the traffic analysis at any interface, instance, or location, at any time. Since the digital processing of traffic of multiple distantly located base stations may be carried out at a central location, the instantiation of the traffic analysis for the traffic of any one of the access nodes may be carried out without transferring any activation or control signals to these distant base station sites.

In an embodiment, the local traffic analysis module is connected to the access node or an interface of the access node, and the local traffic analysis module may capture traffic data from the interface and/or form the access node. The local traffic analysis module may use the traffic data for learning characteristics of the traffic by using machine learning, and for providing predictions and/or decisions regarding actuation of actions on it hierarchy level. Upon making a detection of the anomaly and a decision to counteract the anomaly, the local traffic analysis module may output a command to the access node regarding the decision. The command may instruct the access node to suspend or block a certain user equipment (UE) causing the anomaly.

In general, the machine learning may be described as ability to learn without being explicitly programmed. Machine learning may encompass an algorithm that can learn from and make predictions based on available data, traffic data in the context of embodiments of the present invention. The algorithm may operate by building a model from the received configuration parameters and the traffic data in order to make data-driven predictions or decisions, rather than following strictly static program instructions. Machine learning is related to (and may overlap with) computational statistics in the sense that they both are focused to making predictions by use of computers. Machine learning is generally employed in a range of computing tasks where designing and programming explicit algorithms is unfeasible. Within the field of data analytics, machine learning is a method used to devise complex models and algorithms that lend themselves to prediction.

The local traffic analysis module may upload data and/or decisions taken by the local traffic analysis module to the connected central traffic analysis module. This link together with links to other local traffic analysis modules allows the central traffic analysis module to have an aggregated view of the whole network and of all the local traffic analysis modules it has access to over the connections. Regarding downlink of this interface, the central traffic analysis module may control or configure the local traffic analysis modules by providing configuration parameters. The configuration parameters sent to different local traffic analysis modules is potentially very different, depending on the different operating environments of the different local traffic analysis modules, for example.

The central traffic analysis module may connect to other central traffic analysis modules in order to negotiate about a common policy for handling anomalies, for consulting a higher level central traffic analysis module about the course of action, or for other purposes.

The direct links between the local traffic analysis modules, e.g. via the interface 150, may enable fast responses in local areas to the decisions taken by a local traffic analysis module, fast identification of UE causing the anomaly, etc. This link allows for quick information exchange between the local traffic analysis modules directly, without waiting for the central traffic analysis module to coordinate all information from all the local traffic analysis modules. For example, if a local traffic analysis module suffers from a signalling storm, it may decide to trigger handover of the source of the signalling storm to another access node that has high capacity and capability of taking extra signalling load. The handover decision and execution may be carried out through quick negotiation between the associated local traffic analysis modules and the anomaly may be quickly transferred to an access node capable of sustaining the high signalling load without degradation in service performance. After the handover, the cause of the signalling storm may be mitigated under coordination of the central traffic analysis module.

All communications between the traffic analysis modules may be secured, e.g. by ciphering the communications by using one or more encryption keys.

Let us now describe cooperation between the traffic analysis modules 400 to 416 according to some embodiments of the invention with reference to signalling diagrams of FIGS. 5 to 8. FIGS. 5 to 8 illustrate some embodiments for distributing duties amongst the traffic analysis modules.

Figure 5:
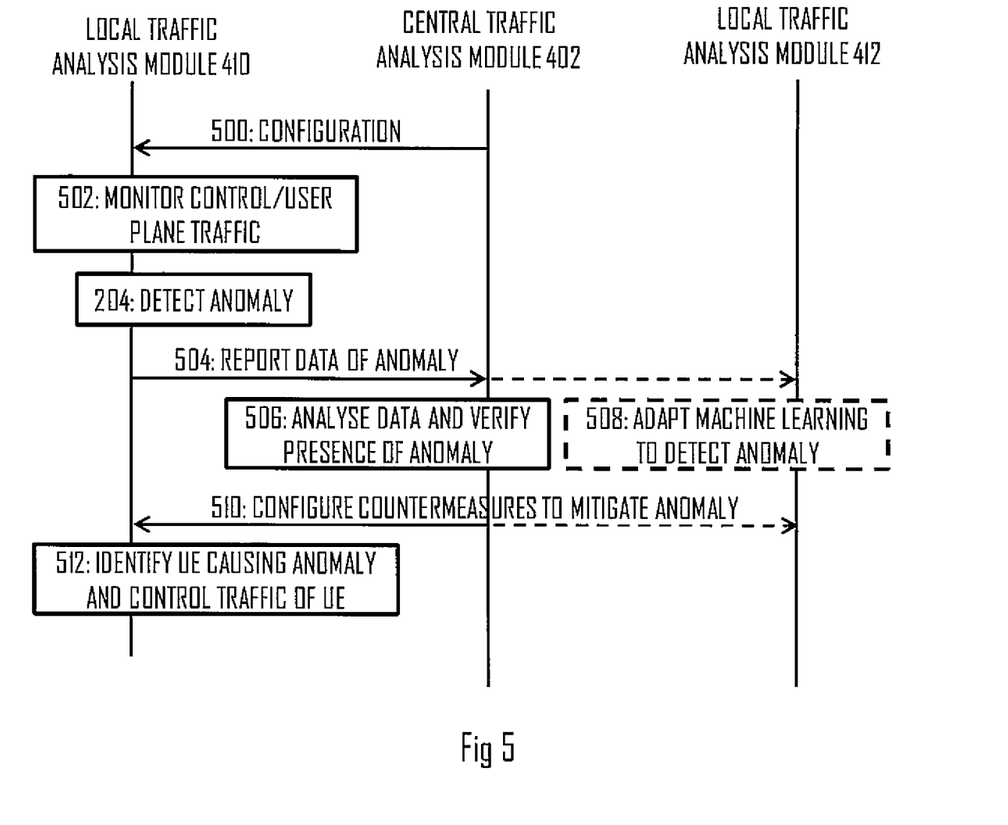
FIGS. 5 to 8 illustrate signalling diagrams of some embodiments for distributed processing of detection and/or mitigation of anomalies in the radio access network.

Referring to FIG. 5, the central traffic analysis module 402 provides the local traffic analysis module(s) it controls with configuration parameters in step 500. In FIG. 5, the configuration parameters is sent to the module 410 but the same or different configuration parameters may be sent to the other local traffic analysis modules 412 under the control of the central traffic analysis module 412. The configuration parameters may enable the machine learning algorithm of the local traffic analysis module 410 to detect anomalies and, for that purpose, the configuration parameters may include at least some of the following parameters: characteristics of known anomalies, one or more threshold values for use in detection of the anomalies, a blacklist or a whitelist of contents in packet headers of monitored traffic, complexity (computational), resource consumption, timing parameters. The characteristics of the known anomalies may include timing-related characteristics of the known anomalies, packet sizes used by the known anomalies, source address (es) of the known anomalies, protocols used by the known anomalies, a traffic profile used by the known anomalies, a transmission frequency profile of the known anomalies, a ratio between signalling and data transmissions of the known anomalies, a device type(s) of known source(s) of the known anomalies, individual source profile of the known anomalies such as a prepaid subscription type, etc.

Upon receiving the configuration parameters in step 500, the local traffic analysis module may start monitoring traffic in an access node or an interface of the access node (block 502). The traffic analysis may include a learning phase where the machine learning algorithm builds a local traffic model representing traffic in the access node and/or interface under normal conditions. When sufficient amount of learning has been carried out, the algorithm is capable of detecting anomalies in the traffic. According to an aspect, the operation of the machine learning algorithm is constant learning even after the capability of detecting the anomalies.

In an embodiment, the local traffic analysis module is configured to monitor control plane traffic and/or user plane traffic.

In an embodiment, the local traffic analysis module 410 may employ the following functions or parameters in the traffic monitoring: one or more data (volume) counters, timestamps to measure delays, number of connected UEs, counters for control plane events, and/or network timers. The analysis can be further enhanced by identifying a device maker of a served UE or a device type, device model, device operating system, device software/firmware version. Such identification may be cross-checked with known operational signatures of the UEs in the analysis. This may enable detection of certain anomalies to which a certain UE is prone. The traffic analysis module may identify an application causing the traffic, e.g. from a 5-tuple (source/target internet protocol address, port number) of a transferred message. Further, the analysis can be enhanced by identifying a user of the served UE and/or an organization of the user. The identification may be made based on transferred content type, UE identifier, subscriber identifier, prototype type etc. Typical identifiers may include International Mobile Equipment Identity (IMEI), International Mobile Subscriber Identity (IMSI), or Mobile Station International Subscriber Directory Number (MSISDN).

Further embodiments of the traffic monitoring may include monitoring the traffic across multiple protocol layers in the radio access network. For example, the local traffic analysis module may monitor the traffic on a medium access control layer and on a higher protocol layer, e.g. radio resource control layer or radio link control layer. This provides for detection of the anomalies on multiple protocol layers in the radio access network. In another embodiment, the local traffic analysis module(s) may monitor the traffic in multiple logical or physical entities of the radio access network. Referring to the older evolution versions such as the second or third generation cellular systems, the local traffic analysis modules may monitor the traffic in the access node and in a base station controller (second generation) or a radio network controller (third generation). In other embodiments, the monitoring may be distributed in another manner to monitoring different logical or physical entities of the radio access network. In yet another embodiment, the local traffic analysis modules may be configured to decipher traffic in the radio access network for the purpose of detecting the anomalies.

In block 204, the local traffic analysis module detects the anomaly. Anomalies may be identified from any deviations from normal average behavior that has been learned from the previously analysed data sets during the learning phase. As an example, if the number of signaling events in general increase compared with data events or overall traffic volume, the corresponding data stream may be set to more detailed inspection. Timing of events can give another strong hint for discovering implementations that cause frequent reconnects or another type of misbehavior. As another example, new sequence of signaling events may exist that deviates from the past sequence of signaling events.

Upon detecting the anomaly, the local traffic analysis module may report the anomaly to the central traffic analysis module. The report may specify the detected anomaly, e.g. the signalling storm, and additionally include data on the basis of which the detection was made (step 504). Upon receiving the report, the central traffic analysis module may perform its own analysis for the received data (block 506). The central traffic analysis module 402 may have carried out a different type of learning phase because of different type of available training data and, additionally, it may employ the collective knowledge shared between the central traffic analysis modules 400 to 404. Generally, the central traffic analysis module may have a more intelligent machine learning capability and, accordingly, it may carry out more reliable detection of the anomaly. From a viewpoint, the local traffic analysis module may detect suspicious behaviour in the monitored traffic, identify the traffic for example by identifying the UE associated with the suspicious traffic, tag the traffic with a tag that indicates that the traffic is suspicious, and output the report comprising the tag and, in some embodiments, the suspicious traffic to the central traffic analysis module.

After step 504, the local traffic analysis module 410 may continue routing the data associated with the detected anomaly to the central traffic analysis module such that the verification of the presence or absence of the anomaly may be carried out more reliably in the central traffic analysis module. For example, the local traffic analysis module may identify the UE or UEs associated with the traffic data on the basis of which the anomaly was detected and route only traffic associated with the UE(s) to the central traffic analysis module 402.

Upon determining in block 506 that the anomaly is present in the traffic of the access node connected to the local traffic analysis module 410, the central traffic analysis module may initiate countermeasures to mitigate the anomaly. This may include identification of the source of the anomaly and suspending or limiting operation of the source.

The countermeasures may involve a range of actions, depending on the anomaly type e.g. blocking the UE, causing handover of the UE from one access node to another access node, suspending communication with the UE, reducing traffic volume of the UE while allowing the UE to cause traffic, transmitting a message to an owner of the UE, and causing software or firmware update at the UE. Some of the actions can take place on the access node, others would require human interaction and a service team.

In an embodiment; upon detecting the anomaly and determining the appropriate countermeasures, the central traffic analysis module may configure the local traffic analysis module or the associated access node directly to apply the countermeasures (step 510). Upon receiving the configuration in step 510, the local traffic analysis module may execute the countermeasures by, for example, determining the relevant UE and focusing the countermeasures to the UE by controlling traffic associated with the UE (block 512). In an embodiment; the central traffic analysis module may additionally in step 510 configure another local traffic analysis module to perform the countermeasures, e.g. in the event that a handover from an access node of the module 410 to an access node of the module 412 is included in the countermeasures. The modules 410, 412 may then both execute block 512, either independently or in cooperation with one another.

In one embodiment, the local traffic analysis module 410 and/or the central traffic analysis module 412 may communicate details of the mitigation and/or anomaly patterns to the other local traffic analysis as a part of the "inoculation" process. This enables sharing of knowledge of the anomalies and their signatures and improves the machine learning capabilities in the other modules. Upon receiving the information on the anomaly, e.g. its signatures or conditions under which the anomaly was detected, the local traffic analysis module 412 may adapt its machine learning algorithm to better detect the anomaly (block 508).

In an embodiment of the countermeasures, the central traffic analysis module 402 may also cause updates and/or changes to a register of the identified UE causing the anomaly. The register may comprise an entry in a home location register (HLR) or a visitor location register (VLR) of the UE. These entries may relate to blocking or suspending a service provided for the UE by the radio access network. The suspension may involve reducing a data rate of the UE or other usage restrictions.

Figure 6:
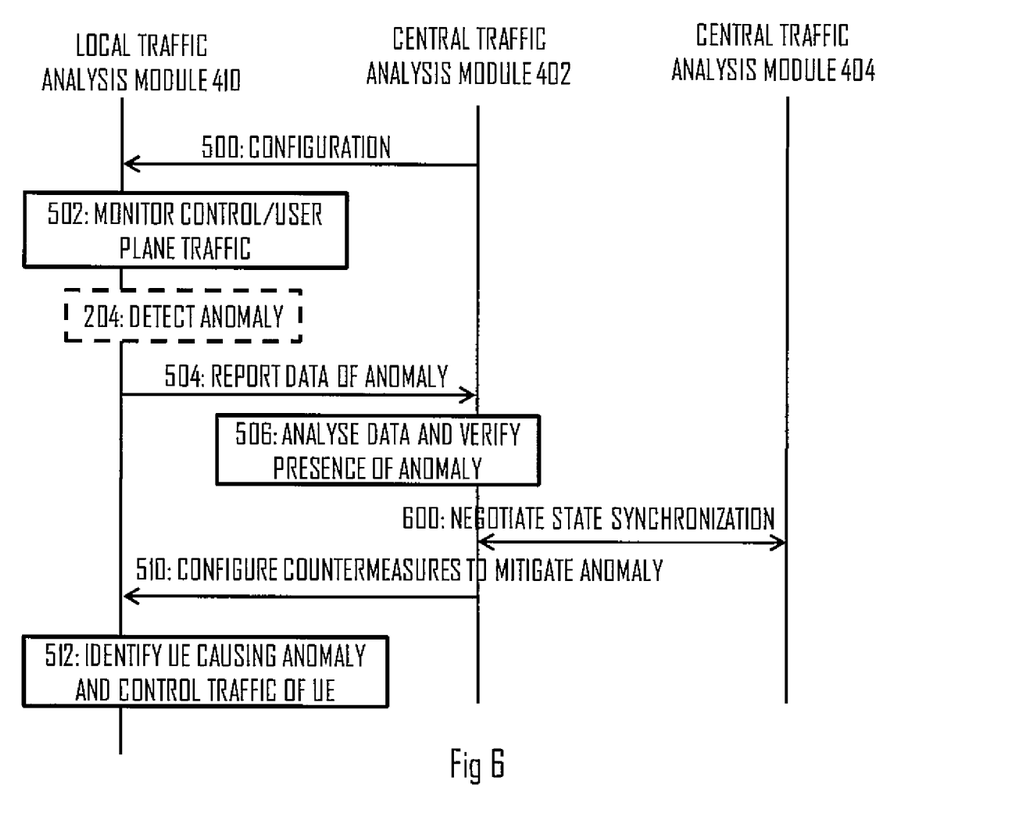

FIG. 6 illustrates another embodiment of the distributed anomaly detection and mitigation. In this embodiment, the local traffic analysis module 410 captures the traffic and performs monitoring of the traffic. However, in this embodiment, the local traffic analysis module 410 does not necessarily perform the anomaly detection (block 204). Instead, the local traffic analysis module may forward at least some of the captured traffic to the central traffic analysis module 402 for analysis (step 504). The local traffic analysis module 410 may capture only a part of the traffic according to certain rules. For example, the rules may include monitoring only flow-level information such as a data rate of one or more data streams, monitoring only packet headers instead of payload portions, etc.

Upon receiving the traffic data (control plane and/or user plane) from the local traffic analysis module(s) 410 in step 504, the central traffic analysis module may employ the machine learning and/or pattern detection algorithm and attempt discovery of anomalies in the traffic data (block 506). Upon detecting an anomaly in block 506, the central traffic analysis module 402 may share information about the detection with another traffic analysis modules) 404 in step 600. Step 600 may comprise negotiating about countermeasures to be taken to mitigate the anomaly, how and on the basis of which data the anomaly was detected, and/or negotiation of whether or not the detected anomaly actually is an anomaly from the viewpoint of the other central traffic analysis module(s) 404. Upon detecting the anomaly, the configuration of the countermeasures may proceed in the above-described manner, for example.

Figure 7:
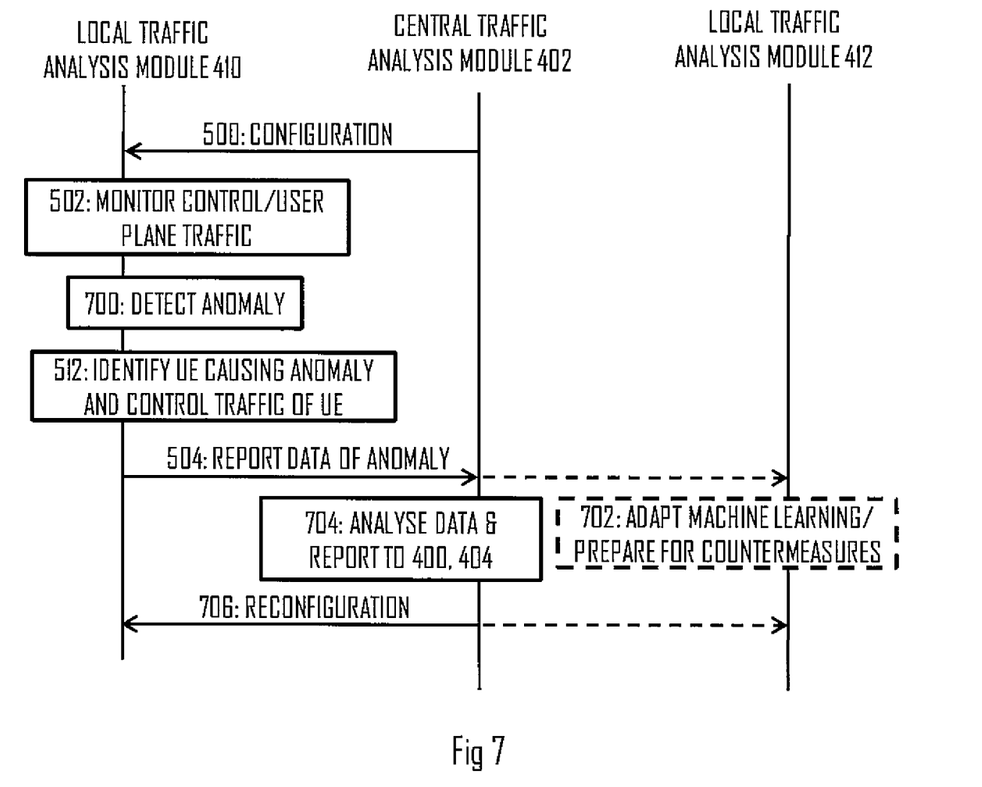

In the embodiments of FIGS. 5 and 6, the local traffic analysis module carries out the analysis of the traffic data on some level but performs the countermeasures under the strict control of the central traffic analysis module. In some scenarios, more expedited response to the emergence of the anomaly may be advantageous. FIG. 7 illustrates an embodiment where the local traffic analysis module 410 may carry out preliminary countermeasures autonomously upon detecting the anomaly. After further study of the anomaly in the central traffic analysis module with more knowledge, the preliminary countermeasures may be tuned to better cope with or mitigate the anomaly. Referring to FIG. 7, the local traffic analysis module may monitor that control/user plane traffic in the radio access network in the above-described manner. In block 700, the local traffic analysis module 410 detects the anomaly. Instead of preliminary detection of the anomaly, block 700 may comprise detection that triggers a countermeasure selection function in the local traffic analysis module 410. The countermeasure selection function may select a countermeasure suitable for the detected anomaly. The function may employ information on the anomaly itself and, additionally, other information on the operating conditions of the access node. The other information may include at least one of the following conditions: current traffic load of the access node, capabilities of the access node, current traffic load of at least one neighboring access node, capabilities of the at least one neighboring access node, available capacity of the access node and/or the at least one neighboring access node. On the basis of the available information, the function may identify the UE(s) causing the anomaly and start controlling traffic of the identified UE(s) in block 512. The controlling may include at least one of the following preliminary countermeasures: blocking the device, isolating the device, causing handover of the device a neighboring access node, suspending communication with the device, reducing traffic volume of the device while allowing the device to cause traffic, transmitting a message to an owner of the device, and causing software or firmware update at the device. With respect to the handover, one of the access nodes may be dedicated to handling the detected anomalies, and the handover may be triggered to the access node having such special capabilities. The special capabilities may include better processing capabilities in the detection of the anomalies, lower traffic load which is in a controlled manner maintained to be low so that there remains capacity to handle the anomalies, and/or other capabilities. With respect to the blocking and isolation of the device, the connectivity of the device with the radio access network may be reduced or even blocked totally. In an embodiment, the isolation may refer to blocking data plane connectivity while allowing control plane connectivity. In another embodiment, the control plane connectivity is reduced by adjusting a radio resource control configuration and/or non-access stratum (NAS) configuration of the device.

Meanwhile, the local traffic analysis module may inform the central traffic analysis module of the detected anomaly and, in some embodiments, provide additional data such as the additional traffic data for use by the central traffic analysis module (step 504). The local traffic analysis module 410 may also inform neighboring local traffic analysis module(s) 412 about the anomaly in step 504. This enables the other local traffic analysis module(s) 412 to prepare for the anomaly in a case that the UE(s) is/are handed over to the neighboring access node(s) (block 702). Additionally, the other local traffic analysis modules may employ the information on the anomaly in their own machine learning algorithm, thereby enabling more efficient detection of the anomaly.

In block 704, the central traffic analysis module may analyse the information received from the local traffic analysis module and, in some embodiments, negotiate about the anomaly with other central traffic analysis modules 400, 404. The negotiation may comprise exchange of information about the countermeasures to mitigate the anomaly. Block 704 may also comprise selecting the countermeasures and determining configuration parameters that mitigate the anomaly. In step 706, the central traffic analysis module may transmit a reconfiguration message to the local traffic analysis module(s) 410, 412, thereby configuring at least the local traffic analysis module to adjust the control function executed in block 512. In this manner, quick response to the anomaly may be realized by making a local decision in blocks 700 and 512, and possible more optimal solution to mitigate the anomaly may be derived by using better detection and countermeasure selection capabilities of the central traffic analysis module 402.

Figure 8:
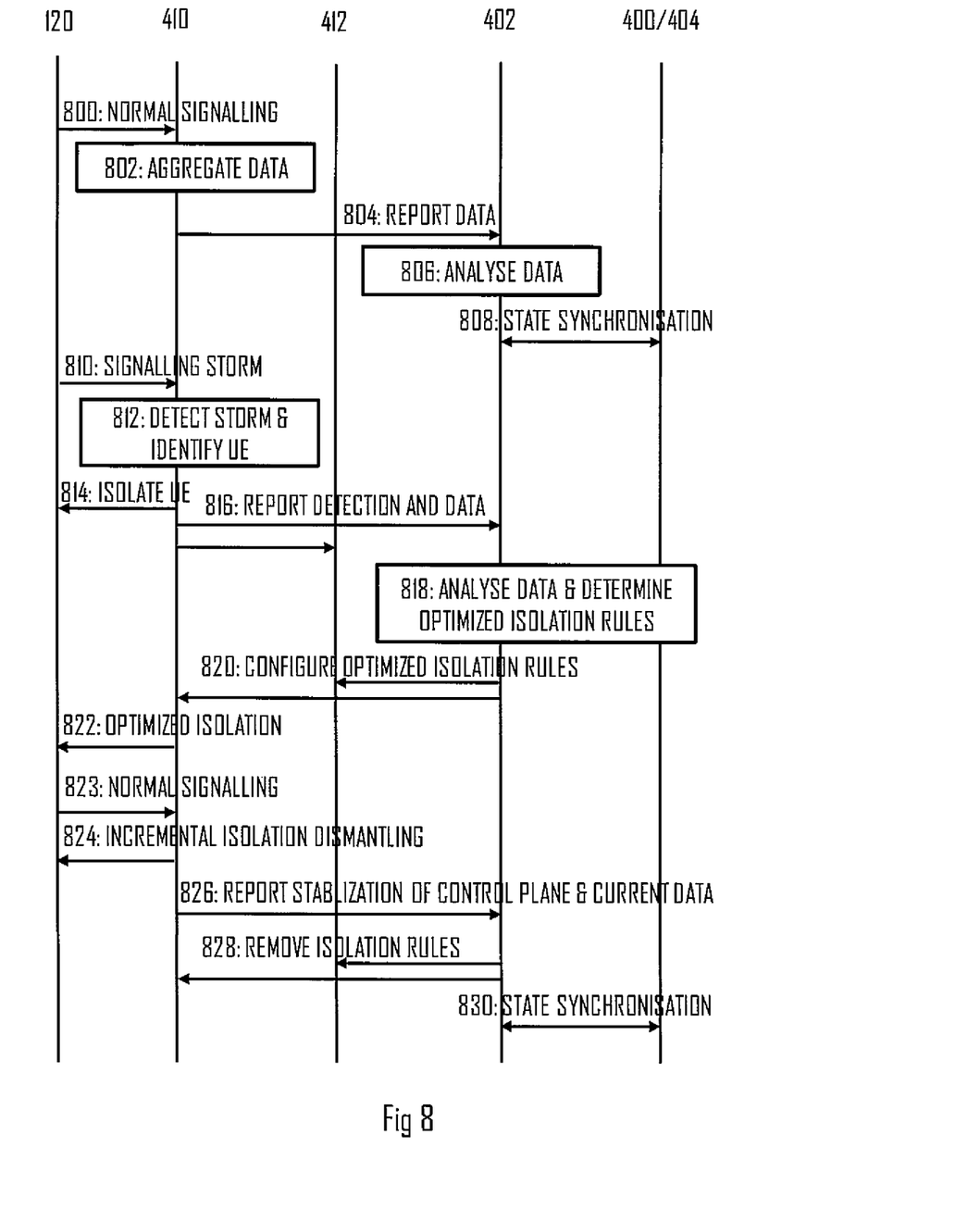

FIG. 8 illustrates the procedure of FIG. 7 in greater detail. Referring to FIG. 8, when the local traffic analyses module 410 and the central traffic analysis module 402 have been initialized, the local traffic analysis module 410 may aggregate and analyse traffic data captured under the conditions where the signaling in the radio access network is normal (steps 800 and 802), and report the data and/or results of the analysis to the central traffic analysis module 402 (step 802). The central traffic analysis module 402 may analyse the data by using its machine learning algorithm (block 806) and available configuration parameters and data gathered from other sources and synchronise its understanding of the normal operating conditions with other central access nodes 400, 404 in step 808. Actual information transferred between the central traffic analysis modules 400 to 404 in step 808 may include a state of the machine learning algorithm, one or more metrics indicating prediction quality, current load, status of the anomaly (e.g. malicious attack, malfunctioning UE, etc.) training data, traffic data or other data related to the anomaly for analysis. In this manner, the traffic analysis modules may build up a common understanding of characteristics of normal operating conditions, normal traffic characteristics, and normal events occurring in the network: on a local level in local traffic analysis modules 410, 412 and on a global or regional level in the central traffic analysis modules 400 to 404.

In step 810, an anomaly emerges. The anomaly may be a signaling storm caused by a malicious or malfunctioning UE 120. By using its machine learning and traffic monitoring functions and knowledge of the normal characteristics and, optionally, shared knowledge of anomalies, the local traffic analysis module 410 detects the signaling storm in block 812. Upon detecting the anomaly, the local traffic analysis module 410 may identify the UE 120 on the basis of one or more messages from which the anomaly was detected. In step 814, the local traffic analysis module initiates preliminary mitigation measures to block at least partially the operation of the UE 120. In step 816, the local traffic analysis module 410 reports the detection and, optionally, data related to the detection, anomaly, identified UE, etc. to the other local traffic analysis module(s) and the central traffic analysis module 402. In block 818 on the basis of information received in step 816, the central traffic analysis module may, independently or in cooperation with other central traffic analysis modules 400, 404 analyse the data and the situation and determine optimized isolation rules for to counter the anomaly. In an embodiment, one of the central traffic analysis modules 400 to 404 is a master module that makes the ultimate decision about the optimized isolation rules. A slave module then applies the isolation rules by configuring associated local module(s) accordingly. In other embodiments, the central traffic analysis modules employ another hierarchy in the decision making. Upon selecting the optimized isolation rules, the central traffic analysis module may configure the optimized isolation rules to the local traffic analysis modules in step 820 by transmitting reconfiguration message(s) defining the optimized isolation rules.

Upon receiving the optimized isolation rules in step 820, the local traffic analysis module may compare the optimized isolation rules with the currently applied blocking functions (executed in step 814) and reconfigure the blocking functions to comply with the optimized isolation rules in step 822. For example, if the preliminary blocking functions employ suspension of the traffic of the UE 120 and the optimized isolation rules indicate that the UE 120 shall be disconnected, the local traffic analysis module 410 may configure associated access node to disconnect from the UE. After the optimized isolation rules, the anomaly may diminish and the traffic status normalizes in the radio access network (step 823). The local traffic analysis module may detect the normalized traffic by using the monitoring and machine learning functions. If there are still some blocking functions prevailing, the local traffic analysis module 410 may gradually start dismantling the blocking functions (step 824) and report the stabilization of the status to the central traffic analysis module (step 826). In an embodiment, the local traffic analysis module may also route traffic data to the central traffic analysis module so that the central traffic analysis module 402 may verify the stabilization by analyzing the traffic data. After the central traffic analysis module has agreed about the stabilization of the operation, the central traffic analysis module may remove the isolation rules implemented in step 820 by transmitting a reconfiguration message to the local traffic analysis module(s) 410, 412 in step 828. The central traffic analysis module may also inform the other central traffic analysis modules about the stabilization and, in some embodiments, any information on how the stabilization was reached (step 830). For example, the central traffic analysis module may share information on the anomaly and isolation rules that resulted in the stabilization which enables sharing of knowledge about the correct countermeasures for use in similar situations in the future.

Figure 9:
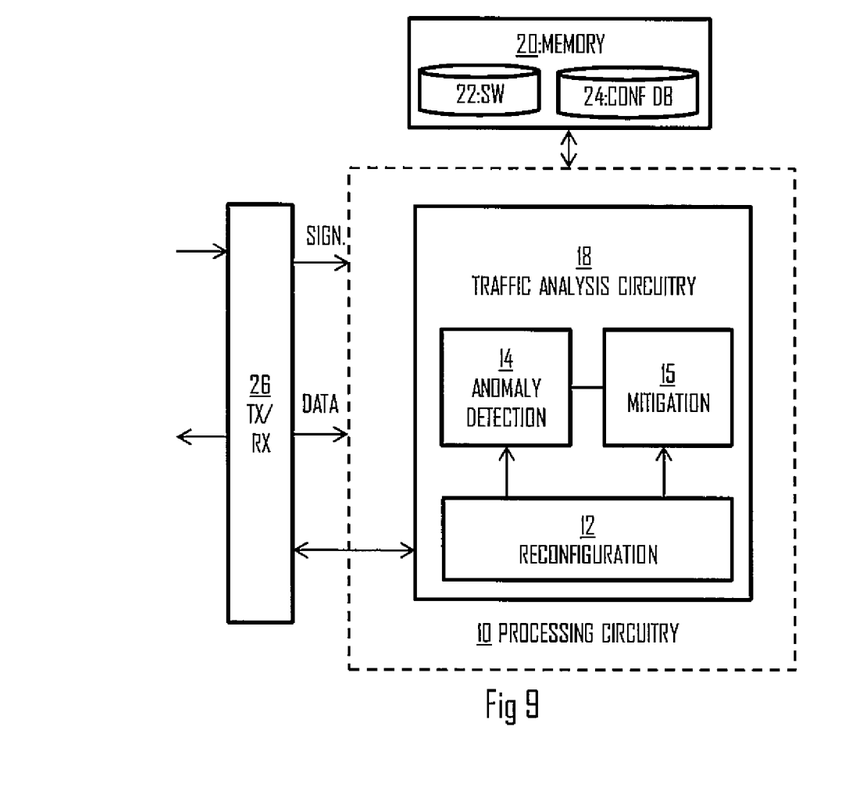
FIGS. 9 and 10 illustrate block diagrams of structures of apparatuses according to some embodiments of the invention.

FIG. 9 illustrates an apparatus configured to carry out the functions described above in connection with the local traffic analysis module. The apparatus may be an electronic device comprising electronic circuitries. The apparatus may comprise a processing circuitry 10 such as at least one processor, and at least one memory 20 including a computer program code (software) 22 wherein the at least one memory and the computer program code (software) are configured, with the at least one processor, to cause the apparatus to carry out any one of the embodiments for performing the traffic analysis and carrying out mitigation functions.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for the traffic analysis. The configuration data may comprise configuration parameters received in block 200 and, optionally, other configuration parameters that may be useful in the detection of the anomalies, mitigation, cooperation with the other traffic analysis modules, etc.

The apparatus may further comprise a communication interface (TX/RX) 26 comprising hardware and/or software for realizing communication connectivity according to one or more communication protocols. The communication interface may provide the apparatus with communication capabilities to receive the traffic data including control plane data (signalling data) or data plane data (payload data), to communicate with the other traffic analysis modules, and enable other types of communication, for example. The communication interface 26 may comprise a hardware interface to an access node in which apparatus is comprised or to which the apparatus is connected. The hardware interface may connect to an interface of the access node. The hardware interface may be used to capture the traffic data for the analysis. The hardware interface may be a unidirectional interface such that the apparatus is only capable of receiving the traffic data through the hardware interface. Additionally, the communication interface 26 may comprise another, bidirectional interface for communication with the access node(s) and/or other traffic analysis modules. The bidirectional interface may provide for internet protocol (IP) connectivity.

The processing circuitry 10 may comprise a traffic analysis circuitry 18 configured to perform the traffic analysis and mitigation according to any one of the above-described embodiments. The traffic analysis circuitry 18 may comprise an anomaly detection circuitry 14 configured to perform the analysis of the captured traffic data. The circuitry 14 may analyse the traffic data according to the configuration parameters by carrying out blocks 202 and 204 or block 502 or block 812, for example. Upon detecting the anomaly, the anomaly detection circuitry 14 may output a notification of the anomaly and, in some embodiments, an identified source of the anomaly to a mitigation circuitry 15 configured to mitigate the anomaly. Depending on the embodiment, the detection of the anomaly may cause the traffic analysis circuitry to report the anomaly to one or more other traffic analysis modules through the communication interface 26. Depending on the embodiment, the mitigation circuitry 15 may carry out the mitigation by employing any one of the above-described mitigation options (e.g. the isolation rules) independently or under the control of a central traffic analysis module.

The traffic analysis circuitry 18 may further comprise a reconfiguration circuitry 12 configured to configure the operation of the circuitries 14 and 15 according to the configuration database 24 and/or configuration parameters received through the communication interface 26. For example, when another local traffic analysis module reports characteristics of a detected new anomaly to the apparatus, the reconfiguration circuitry 12 may reconfigure the anomaly detection circuitry with the received characteristics such that the anomaly detection circuitry 14 has better capabilities of detecting the new anomaly.

Figure 10:
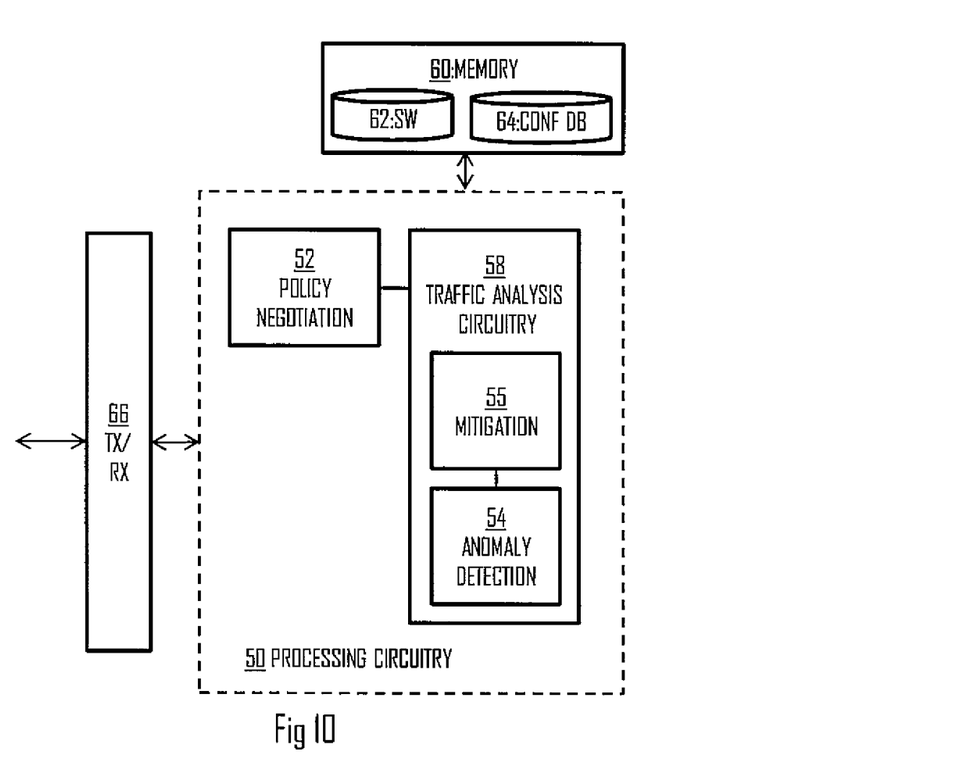

FIG. 10 illustrates an apparatus configured to carry out the functions described above in connection with the central traffic analysis module. The apparatus may be an electronic device comprising electronic circuitries. The apparatus may comprise a processing circuitry 50 such as at least one processor, and at least one memory 60 including a computer program code (software) 62 wherein the at least one memory and the computer program code (software) are configured, with the at least one processor, to cause the apparatus to carry out any one of the embodiments for performing the traffic analysis, carrying out mitigation functions, and cooperating with other central traffic analysis modules.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing configuration data for the traffic analysis. The configuration data may comprise configuration parameters used in the detection of the anomalies, mitigation, cooperation with the other traffic analysis modules, etc.

The apparatus may further comprise a communication interface (TX/RX) 66 comprising hardware and/or software for realizing communication connectivity according to one or more communication protocols. The communication interface may comprise a network adapter capable of providing Internet protocol connectivity, for example. The communication interface 66 may provide the apparatus with communication capabilities to communicate with the other traffic analysis modules and enable other types of communication, for example.

The processing circuitry 50 may comprise a traffic analysis circuitry 58 configured to perform the traffic analysis and mitigation according to any one of the above-described embodiments described in connection with the central traffic analysis module. The traffic analysis circuitry 58 may comprise an anomaly detection circuitry 54 configured to perform the analysis of the traffic data received from one or more local traffic analysis modules. The anomaly detection circuitry 54 may employ a different algorithm and/or different configuration parameters than the anomaly detection circuitry 14. Upon detecting the anomaly, the anomaly detection circuitry 54 may output a notification of the anomaly and, in some embodiments, an identified source of the anomaly to a mitigation circuitry 55 configured to mitigate the anomaly. The mitigation circuitry 55 may control the local traffic analysis modules in the mitigation of the anomaly, e.g. as described in connection with steps 818-828 of FIG. 8.

The processing circuitry 50 may further comprise a policy negotiation circuitry 52 configured to connect to the other central traffic analysis modules and, in some embodiments, to other modules of the core network and/or other core networks, e.g. in steps 808, 830. For example, the policy negotiation circuitry 52 may connect to the other modules upon detecting the anomaly and negotiate about the policy in the mitigation of the anomaly. Upon reaching the conclusion in the negotiation, the policy negotiation circuitry 52 may control the mitigation circuitry 55 to apply the policy by controlling the local traffic analysis module(s) in the mitigation.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 8 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any module or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The embodiments described above are applicable to monitoring any control and/or user plane traffic that is available at the radio access network and/or the core network. The traffic may include, for example, machine-to-machine (M2M) type of traffic which may be considered as being generated by any technology that enables networked devices to exchange information and perform actions without the manual assistance of humans. Future M2M or IoT devices may be designed to be very power-efficient and, therefore, have limited capabilities. These devices may support a low level (or even no) authentication and authorization procedures than other devices such as cellular phones with a user interface. The M2M devices may send traffic towards the network without prior procedure of attachment to the radio access network and/or the core network. The M2M device may send a very small amount of data infrequently. Due to a huge number of such devices, the total volume of M2M traffic may be high.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
receiving, in connection with a first access node of a radio access network, configuration parameters in connection with a second access node of the radio access network or in connection with a mobility management entity or a gateway of a core network in connection with a plurality of access nodes of the radio access network;
monitoring, in connection with the first access node using the received configuration parameters, traffic in the radio access network;
detecting, in connection with the first access node, in the monitored traffic on the basis of the received configuration parameters, an anomaly causing a control plane signalling load;
exchanging, in connection with the first access node and in connection with a different access node of the radio access network, information regarding capacity and capability of the different access node to take extra control plane signalling;
in response to said detecting and said exchanging, taking, in connection with the first access node, an action to mitigate the anomaly and reporting, in connection with the first access node and in connection with the mobility management entity or the gateway, information on the anomaly;
identifying, in connection with the first access node, a source causing said anomaly on the basis of at least one message of the monitored traffic; and
routing, in connection with the first access node and in connection with the mobility management entity or the gateway, a plurality of messages associated with the identified source.

2. The method of claim 1, wherein said reporting comprises transmitting, in connection with the first access node and in connection with the mobility management entity or the gateway, data representing traffic that caused said detection.

3. The method of claim 1, further comprising indicating, in connection with the first access node and in connection with another access node of the radio access network, the detected anomaly.

4. The method of claim 1, wherein said action to mitigate the anomaly comprises controlling traffic of the identified source.

5. The method of claim 4, wherein said controlling the traffic of the identified source comprises at least one of:
blocking the identified source,
causing handover of the identified source from one access node of the radio access network to another access node of the radio access network,
suspending communication with the identified source,
reducing traffic volume of the identified source while allowing the identified source to cause traffic,
transmitting a message to an owner of the identified source, or
causing software or firmware update at the identified source.

6. The method of claim 1, wherein the monitoring comprises monitoring traffic in one of the plurality of access nodes.

7. An apparatus comprising:
at least one processor; and
at least one non-transitory memory including computer program code,
wherein the at least one non-transitory memory and the computer program code are configured, with the at least one processor, to cause the apparatus at least to:
receive configuration parameters in connection with a second access node of a radio access network or in connection with a mobility management entity or a gateway of a core network in connection with a plurality of access nodes of the radio access network;
monitor, using the received configuration parameters, traffic in the radio access network;
detect, in the monitored traffic on the basis of the received configuration parameters, an anomaly causing a control plane signalling load;
exchange, in connection with a different access node of the radio access network, information regarding capacity and capability of the different access node to take extra control plane signalling;
in response to said detection and said exchange, take an action to mitigate the anomaly and report, in connection with the mobility management entity or the gateway, information on the anomaly;
identify a source causing said anomaly on the basis of at least one message of the monitored traffic; and
route, in connection with the mobility management entity or the gateway, a plurality of messages associated with the identified source.

8. An apparatus according to claim 7, wherein said reporting comprises causing the apparatus to transmit, in connection with the mobility management entity or the gateway, data representing traffic that caused said detection.

9. An apparatus according to claim 7, further configured to indicate, in connection with another access node of the radio access network, the detected anomaly.

10. An apparatus according to claim 7, wherein said action to mitigate the anomaly comprises causing the apparatus to control traffic of the identified source.

11. An apparatus according to claim 7, wherein the monitoring comprises monitoring traffic in one of the plurality of access nodes.

12. A computer program product embodied on a non-transitory distribution medium readable by a computer and comprising program instructions which, when loaded into an apparatus and executed on at least one processor, cause the apparatus at least to:
receive configuration parameters in connection with a second access node of a radio access network or in connection with a mobility management entity or a gateway of a core network in connection with a plurality of access nodes of the radio access network;
monitor, using the received configuration parameters, traffic in the radio access network;
detect, in the monitored traffic on the basis of the received configuration parameters, an anomaly causing a control plane signalling load;
exchange, in connection with a different access node of the radio access network, information regarding capacity and capability of the different access node to take extra control plane signalling;
in response to said detection and said exchange, take an action to mitigate the anomaly and report, in connection with the mobility management entity or the gateway, information on the anomaly;
identify a source causing said anomaly on the basis of at least one message of the monitored traffic; and
route, in connection with the mobility management entity or the gateway, a plurality of messages associated with the identified source.

13. A computer program product according to claim 12, wherein said reporting comprises causing the apparatus to transmit, in connection with the mobility management entity or the gateway, data representing traffic that caused said detection.

14. A computer program product according to claim 12, where the program instructions are further configured to cause the apparatus to indicate, in connection with another access node of the radio access network, the detected anomaly.

15. A computer program product according to claim 12, wherein said action to mitigate the anomaly comprises causing the apparatus to control traffic of the identified source.

16. A computer program product according to claim 15, wherein said causing the apparatus to control the traffic of the identified source comprises at least one of:
block the identified source,
cause handover of the identified source from one access node of the radio access network to another access node of the radio access network,
suspend communication with the identified source,
reduce traffic volume of the identified source while allowing the identified source to cause traffic,
transmit a message to an owner of the identified source, or
cause software or firmware update at the identified source.

17. A computer program product according to claim 12, wherein the monitoring comprises monitoring traffic in one of the plurality of access nodes.

* * * * *